United States Patent [19]

Ruppel

[11] 4,362,592

[45] Dec. 7, 1982

[54] PLY TURN-UP MEANS IN A TIRE BUILDING MACHINE

[75] Inventor: Donald B. Ruppel, Akron, Ohio

[73] Assignee: The B. F. Goodrich Company, New York, N.Y.

[21] Appl. No.: 252,637

[22] Filed: Apr. 9, 1981

[51] Int. Cl.[3] .......................................... B29H 17/22
[52] U.S. Cl. ................................................. 156/402
[58] Field of Search ............... 156/402, 132, 398, 400, 156/408, 412, 413

[56] References Cited

U.S. PATENT DOCUMENTS

| 2,409,974 | 10/1946 | Breth et al. | 156/402 |
|---|---|---|---|
| 2,838,091 | 6/1958 | Kraft | 156/402 |
| 3,075,570 | 1/1963 | Garver | 156/402 |
| 3,887,423 | 6/1975 | Gazuit | 156/402 |

*Primary Examiner*—Michael W. Ball

*Attorney, Agent, or Firm*—Joseph Januszkiewicz

[57] ABSTRACT

A ply turn-up and stitching device for use with a tire building drum wherein the building drum supports a tire carcass thereon with ply stock or fabric wound thereon and wherein the fabric extends beyond the edges of the tire building drum. Separate means is provided to place tire beads onto the respective edges of the building drum. The ply turn-up device upon actuation moves a profiled cam to a predetermined position adjacent the drum and then actuates the turn-up device to perform a turn-up of the marginal edges of the ply stock or fabric over the tire beads followed by a stitching of the remaining fabric onto the tire carcass to complete the operation. On return of the ply turn-up device to its remote position, it carries the profiled cam away from the tire building drum to facilitate the removal of the drum.

6 Claims, 7 Drawing Figures

PLY TURN-UP MEANS IN A TIRE BUILDING MACHINE

BACKGROUND OF THE INVENTION

This invention relates to a tire building machine and more particularly to an improved apparatus for turning the edges of a tire carcass ply stock over the bead cores and the stitching of the turned edges.

Tire building machines either use mechanized ply turn-up devices or variations thereon which incorporate inflatable bladders to turn the edges of the plies at the drum shoulders up and over onto the adjacent surfaces of the tire carcass of the building drum to thereby encase the spaced inextensible beads or bead cores at the drum shoulders. When building a tire carcass, the carcass plies are wrapped circumferentially around the building drum having the annular marginal ply portions of certain plies extending beyond the ends of the drum. After the carcass is built up with the proper plies, the bead rings or cores are positioned against the spaced respective annular portions of the tire carcass plies at the drum shoulders. These operations described may be done at one building station or at one of a multiple of stations. Since the annular marginal ply portions that extend over the edges of the tire building drum are not supported, it is important to provide a turn-up device that exerts an even pressure over the entire range of manipulation of the plies. The use of bladders presents several problems since the inflation of such bladders expands in accordance with the constructed reinforcement thereof whereas the marginal ply portions of the ply stock may droop or sag unevenly especially at the top and bottom portions of the building drum as compared to the side edges of the tire building drum. The present invention is directed to a mechanical turn-up device that has a wide range of movement, having the ability to engage the marginal edges of the plies in a manner to exert an even force to provide a uniform expansion and turn up followed by a turn down that maintains continual contact. This action provides a uniform tension and distribution of the ply ends thereby eliminating dimensional non-uniformity. This is particularly useful in the building of large tires where it is desirable to be able to engage the marginal edge portions of the plies on the underneath portions or inside portions as the plies extend and sag over the edges of the tire building drum. Such mechanical turn-up devices are superior over inflatable bladders since the latter have problems of structural failure of the cord fabric, misalignment of such cord fabric in their fabrication and individual cord failure that leads to uneven turn-up. Further, with the use of bladders, additional mechanisms must be used to accomplish the ply stitching whereas with the mechanical turn-up described, the stitching is performed as a follow up of the turning up of the plies whereby contact with the marginal edges of the plies is maintained to insure dimensional uniformity in the turn up and stitching.

SUMMARY OF THE INVENTION

A ply turn-up and stitching device for use with a tire building drum wherein the turn-up and stitching device carries a cam means to and from the edges of the tire building drum to provide greater clearance and flexibility to the turn-up device permitting the positioning of the turn-up device closer to the axial center line of the drum prior to its radial outward movement. The ply turn-up and stitching device also chucks up the tire building drum permitting its use in multi-station tire building.

DETAILED DESCRIPTION

Figure 1:
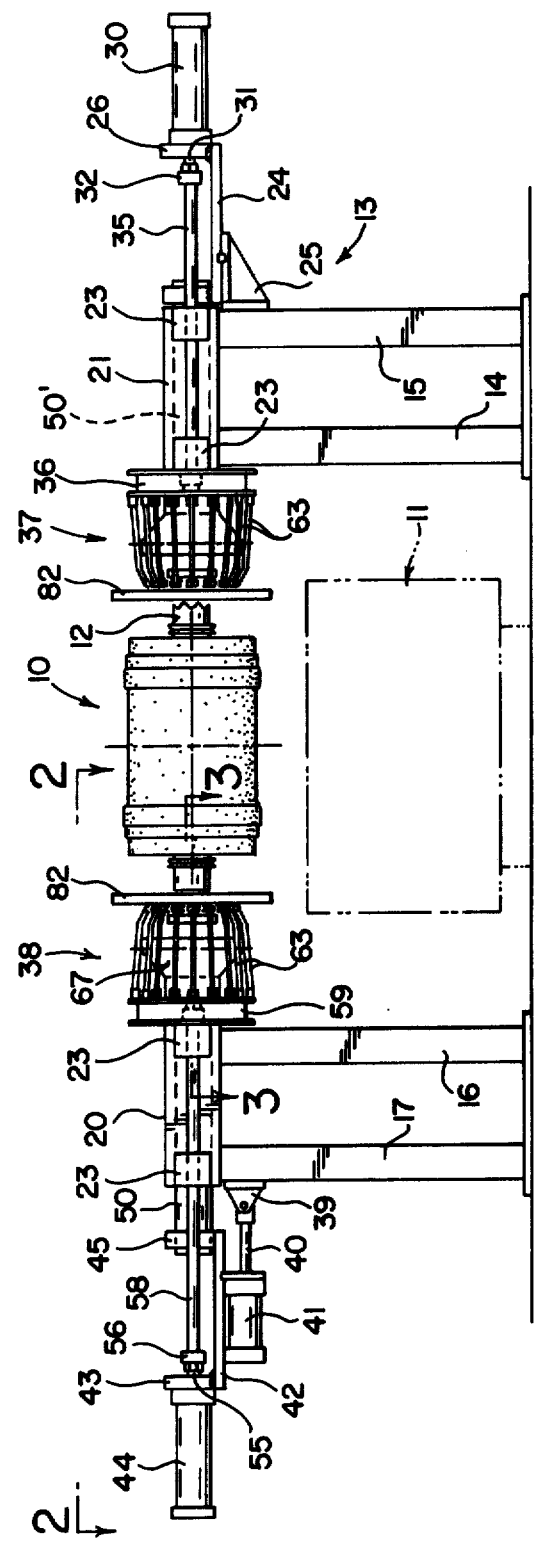
FIG. 1 is a side elevation of a single station of a multiple station tire building machine embodying the ply turn-up and stitching mechanism of this invention.

Referring to the drawings wherein like reference numeral designate like or corresponding parts throughout the several views, there is shown in FIG. 1 one of the stations of a multiple station automatic tire building machine of the type disclosed by U.S. Pat. No. 2,319,643. In a machine of this type collapsible tire building drums 10 have a tire carcass built threon in a band form sequentially at successive stations between which the drums are transported by a suitable conveyor means designated as 11 in a manner old and well known in the art. Such conveyor 11 will include a plurality of chains and cradles or carriages which support one of a series of tire building drums 10 which drums are supported by a shaft 12 to facilitate the chucking up of such drum 10.

The ply turn-up station 13 shown in FIG. 1 has two pairs of spaced supports 14, 15 and 16, 17. Mounted on the respective supports 14, 15 and 16, 17 are spaced support members 20 and 21. Each support member 20 and 21 has a plurality of laterally extending guide blocks 23. A bracket or outboard support 24 is rigidly connected to support 15 and support member 21 with an additional angle bracket 25 to provide rigidity to such structure. A power operated means or cylinder 30 is mounted on bracket 24 with the aid of a support bracket 26. A piston rod 31 of cylinder 30 is connected to a crosshead 32, which crosshead 32 supports for axial movement a pair of spaced horizontally extending guide rods 35 (only one shown in FIG. 1). The guide rods 35 extend through guide blocks 23 and are attached to an annular support member 36. Support member 36 has a ply turn-up and stitching mechanism 37 similar to a ply turn-up and stitching mechanism 38 mounted on the other side of the tire building drum 10 as viewed in FIG. 1. Support member 17 has a bracket 39 pivotally connected to a piston rod 40 of a hydraulic cylinder 41 which cylinder 41 is suitably attached to a support bracket or frame 42 (FIG. 1). Support frame 42 has one end connected via a bracket 43 to a hydraulic cylinder 44 and the other end connected to bracket 45. Bracket 45 is connected to one end of a spindle 50 for axial movement toward and away from the drum 10. Spindle 50 has the end tapered as at 51 operative upon axial movement to engage a complimentary bore 52 in shaft 12 of tire building drum 10. As viewed in FIGS. 1, 3 and 4, upon pressurization of the rod end of cylinder 41, cylinder 41 moves rightward along with brackets 41, bracket 43, and spindle 50 effecting a chucking up of the tire building drum 10. A spindle 50' is secured to support member 21 and is cooperative with the movement of spindle 50 to engage both ends of shaft 12. Cylinder 44 has its piston rod 55 connected to a crosshead 56 which in turn is connected to a pair of guide rods 57–58. Guide rods 57 and 58 extend through the guide blocks 23—23 and are attached to an annular moveable support member 59. Support member 59 is identical to support member 36 on the right side of the described apparatus which supports the ply turn-up and stitching mechanism 37. Support member 59 supports the ply turn-up and stitching mechanism 38.

Figure 2:
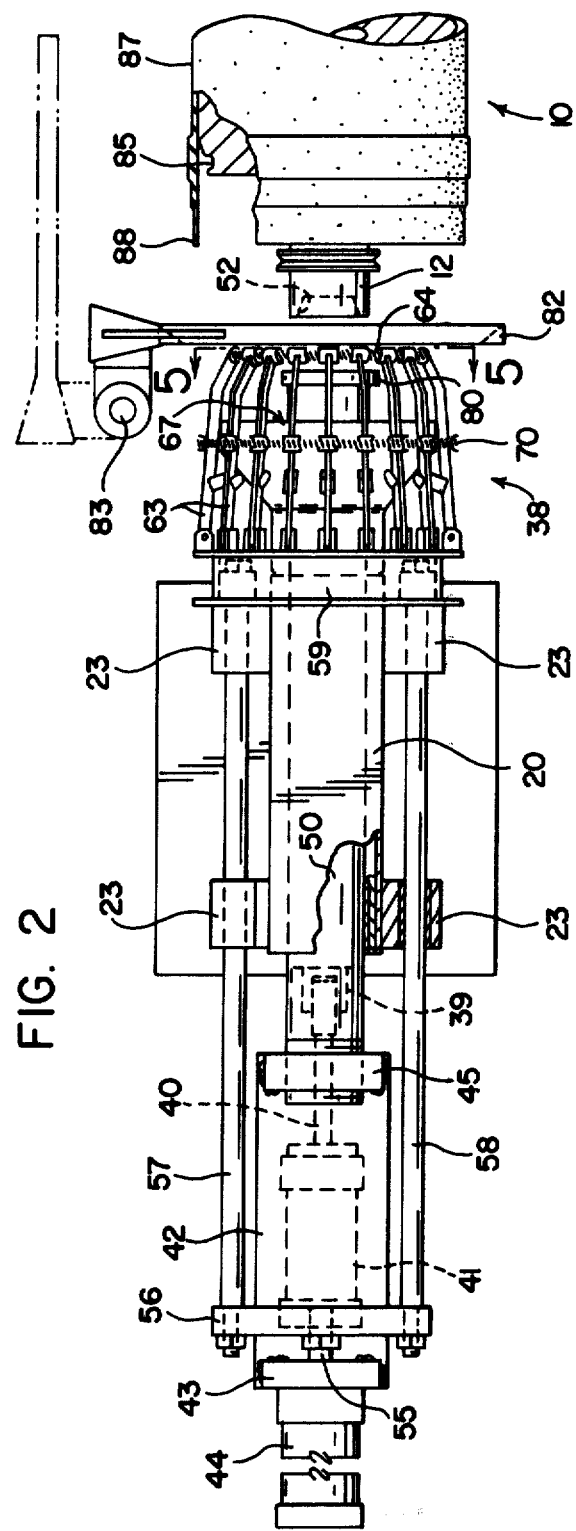
FIG. 2 is an enlarged plan view of one end of the tire building machine taken on line 2—2 of FIG. 1.
Figure 3:
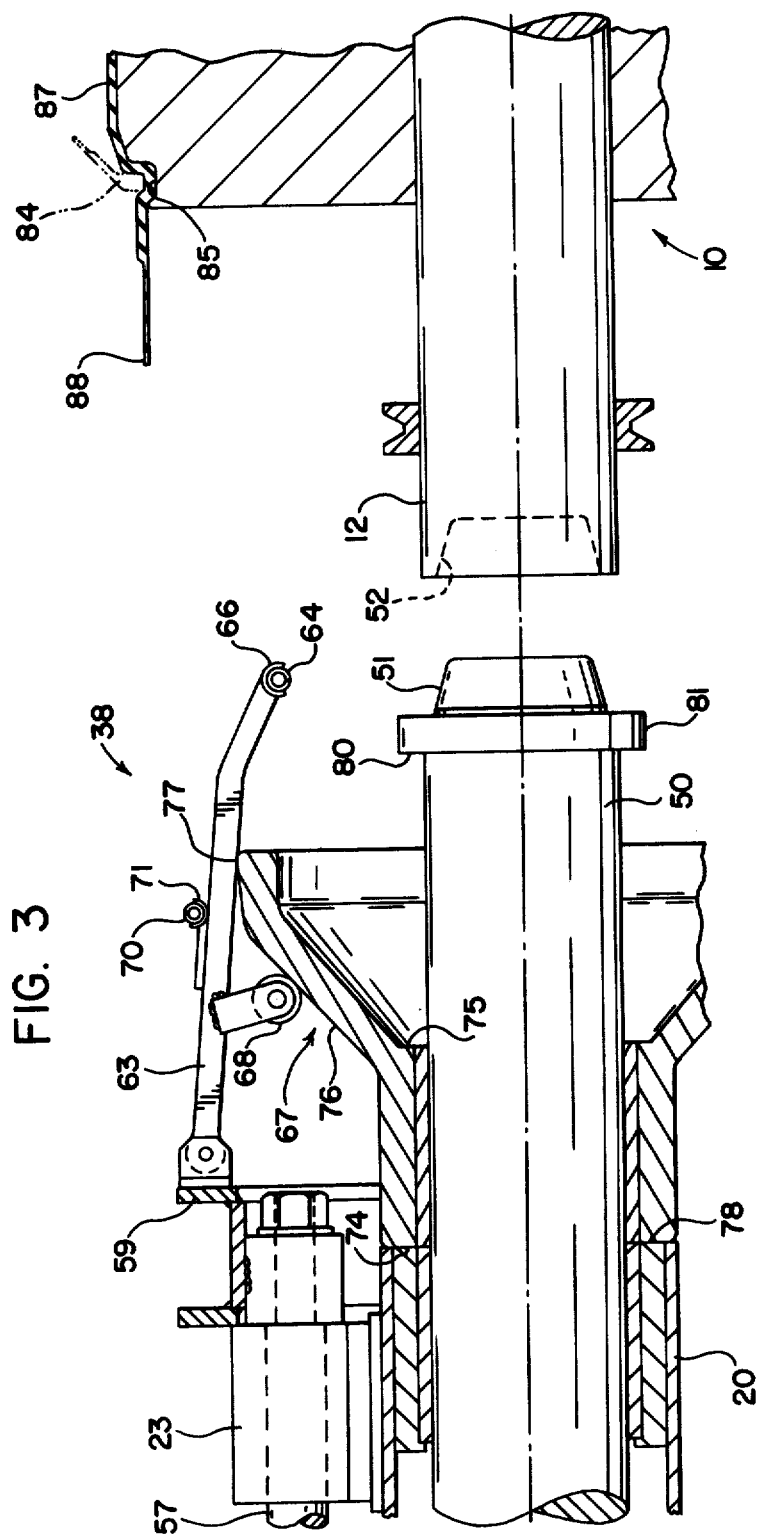
FIG. 3 is an enlarged view of a portion of the mechanism which is used to lift the marginal ply stock edge and the one end of a tire drum taken on line 3—3 of FIG. 1.
Figure 5:
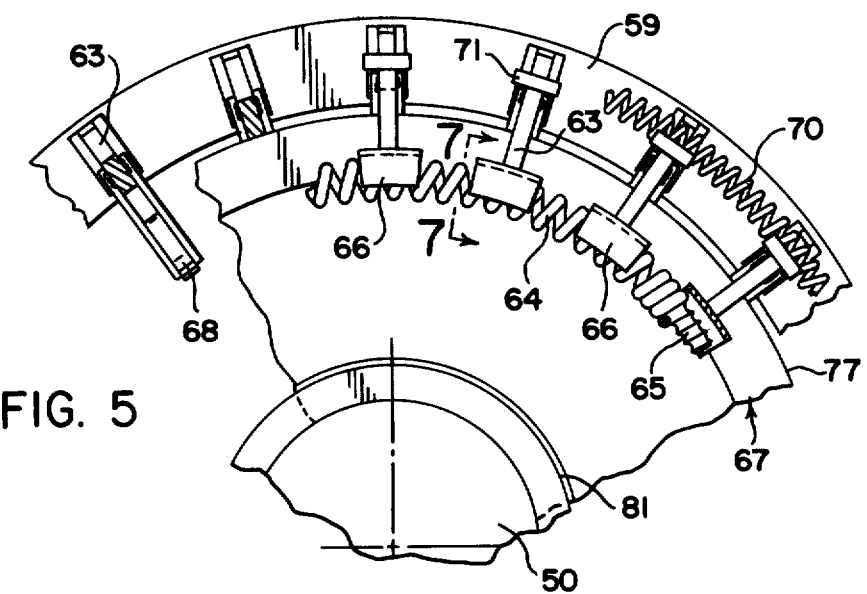
FIG. 5 is a fragmentary, partial section view taken on line 5—5 of FIG. 2 showing the helical coil spring for making a ply turn-up and the stitching together with the supporting and actuating arms.
Figure 6:
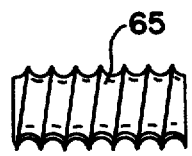
FIG. 6 is an enlarged side elevational view of a threaded connector for the ends of the helical coil spring.
Figure 7:
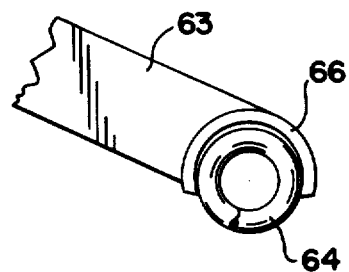
FIG. 7 is an enlarged fragmentary side elevational view taken on line 7—7 of FIG. 5.

To each of the axially moveable support members 36 and 59 are attached a plurality of circumferentially spaced elongated arms 63 extending outwardly therefrom in a generally parallel relationship. The free ends of the arms 63 are radially moveable and support an annular shaped expansible and rollable member such as a helical coil spring 64, there being one such helical coil spring 64 adjacent each end of the tire building drum 10. Each coil spring 64 is of a continuous length to form a complete annulus of a size that is circumferentially less than the inside diameter of the tire building drum 10 and is connected at the abutting ends by a threaded connector 65. The coil springs 64 are retained on the arms 63 by segments of an annular shell 66 carried by the arms 63. The annular shells 66 partially encompass the coil spring 64 with a radially inner portion of the coil spring projecting out from the openings of the shells (note FIGS. 5 and 7). The outside diameter of each coil spring 64 is slightly less than the inside diameter of the annular shell segments 66, thus permitting the helical coil spring 64 to be freely rotatable. The arms 63 are rigid members pivoted at their one end on the support members 59 or 36 for radial movement of the outboard or outer ends along with the coil springs 64 carried thereby. The radial movement of the coil springs 64 is correlated with the axial movement of the springs to and from the tire building drum 10 by cam means 67 that is coaxial with the tire drum shaft 12 and is slidably supported by spindle 50 or 50'. Each arm 63 has a cam follower 68 which rides upon such cam means 67. The cam followers 68 are maintained in contact with the cam surfaces by the biasing or constricting force of the coil spring 64 and a second circumferentially encompassing spring 70. The intermediate portion of each arm 63 has a u-shaped bracket 71 on its outer surface such as to receive the circumferentially encompassing spring 70. The pair of circumferentially extending springs 70 and 64 maintain sufficient constrictive force on the cam means 67 to axially move the cam means 67 therealong as the respective ply turn-up means 37 and 38 are moved within defined limits. Cam means 67 has a rearwardly disposed annular shoulder 74, a forwardly disposed annular shoulder 75, an annular tapering cam surface 76 and an outermost annular edge 77. With the rod end of cylinder 44 pressurized, guide rods 57 and 58 along with support member 59 are moved to the extreme left position as seen in FIGS. 1 and 3 such that the arms 63 with the constraining forces of springs 64 and 70 move cam means 67 to the left whereby annular shoulder 74 abuttingly contacts the annular shoulder 78 on support member 20. In this position of the ply turn-up and stitching mechanism 38, the outer ends of arms 63 along with coil spring 64 is drawn radially inwardly to present a relatively small circumferential dimension relative to the placement of any bands of ply stock on the tire building drum. As the head end of cylinder 44 is pressurized, piston rod 55 along with crosshead 56 and guide rods 57 and 58 are moved axially inwardly towards the tire building drum 10, carrying the ply turn-up and stitching mechanism 38 therealong until shoulder 75 abuttingly engages an annular shoulder 80 on a flange 81 located on the inboard end of spindle 50. Once shoulder 80 is contacted, the cam means 67 remains stationary while cam followers 68 ride up on the cam surface 76 effectively lifting the plural arms 63. The apparatus for positioning bead cores into position for movement onto the tire carcass is shown in FIG. 2. A bead holder 82 pivotally mounted as at 83 to the rearward side of the tire building machine 10 is adapted to handle the positioning of the bead cores for placement on the tire carcass. Such devices are old and well known in the art, and accordingly will not be described in detail, however, such bead holder is essentially an annular support, recessed on its inner periphery to receive a bead core 84. Such bead holder 82 and its supporting structure may be suitably mounted on a guide bar or carriage to facilitate its movement axially into position such that the bead core 84 is seated on the plies at the shoulder 85 of the tire building drum 10.

Figure 4:
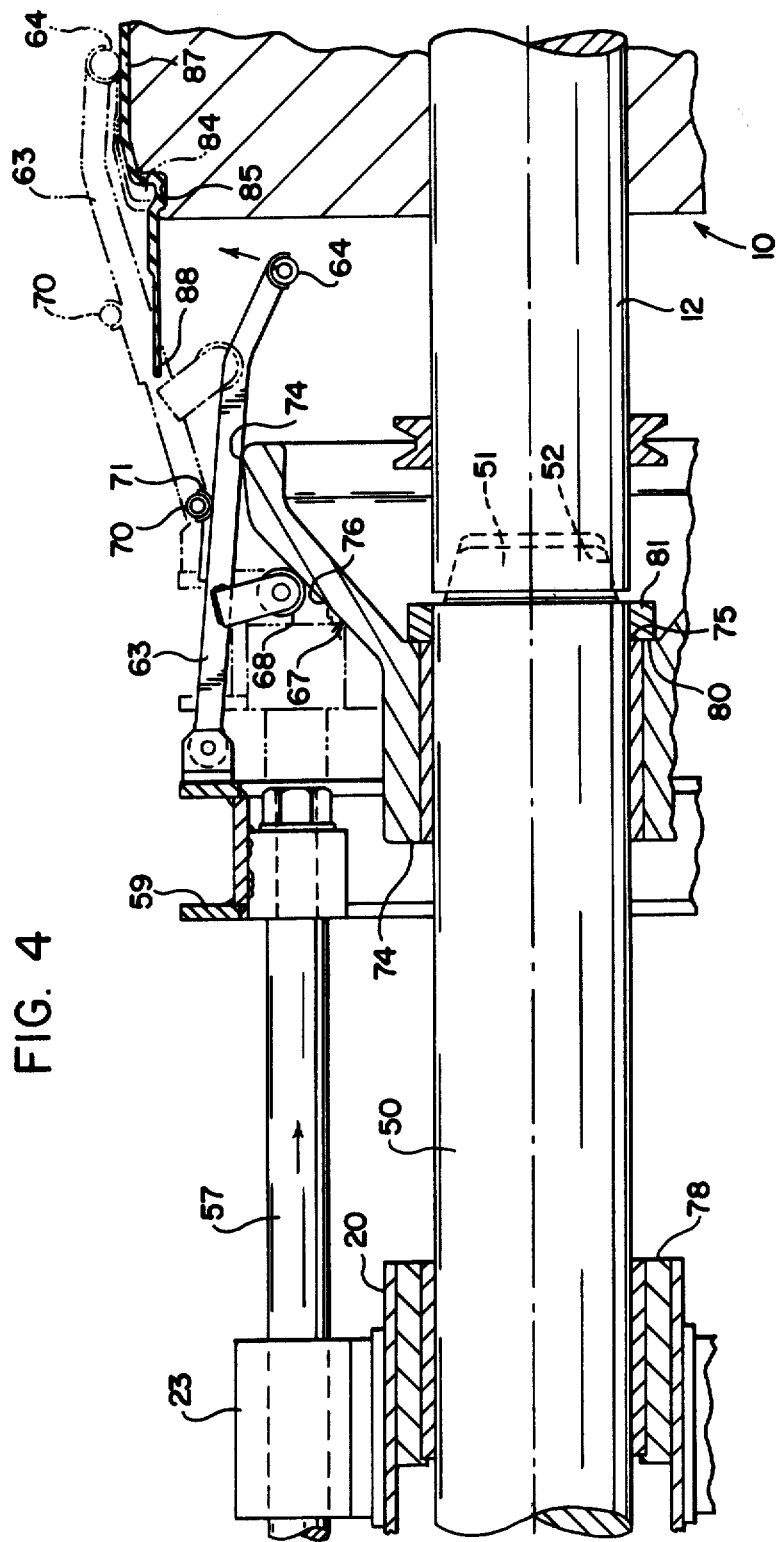
FIG. 4 is an enlarged fragmentary view of one end of a ply stock lifting and stitching mechanism along with a portion of a tire building drum.

In describing the operation of the ply turn-up and stitching mechanism only the left side of the apparatus utilizing the ply turn-up and stitching mechanism 38 will be described, it being understood that the ply turn-up and stitching mechanism 37 is identical except for the fact that the left side has hydraulic cylinder 41 whose purpose is to move spindle 50 rightward to chuck up the tire building drum 10 since spindle 50' is stationary. After cylinder 44 is operated, the functions and operations are identical. In describing the operation, the tire building drum has been previously provided with ply stock 87 and that the bead cores 84 have been transferred to the tire plies at the shoulders 85 on the drum so that the plies at the outer edges of the tire drum are as shown in FIG. 4. As previously mentioned, the overlying plies have a tendency to droop as it overhands the edges of the drum, which is more prominent in the larger size tires. The next step is the pressurization of the head end of cylinder 44 thereby exerting inward (towards the tire drum) pressure on piston rod 55 causing such rod 55 to be moved inwardly along with crosshead 56, guide rods 57, 58 and the ply turn-up and stitching mechanism 38. During the initial portion of this movement, springs 64 and 70 also move the cam means 67 therealong. The circumferentially extending spring 64 is moved within the outwardly extending edge 88 of the ply stock 87. As the axial movement of the cam means 67 and the ply turn-up and stitching mechanism continues, the shoulder 75 on cam means 67 comes into abutting contact with abutment 80 on flange 81 supported by spindle 50. As the axial movement of ply turn-up and stitching mechanism 38 continues, all of the cam followers 68 of the arms 63 rise in accordance with the tapered cam surface 76 raising the free end of all of the arms 63, and the coil spring 64 supported thereby, to thereby move from their retracted position beneath the edge of the ply stock, radially outwardly as well as axially inwardly which action lifts the entire periphery of the outer edge 88. This continual contact of the spring 64 and the annular shell 66 effects a tensioning of the ply stock 87 thereby pulling the entire edge 88 tightly about the bead core 84. As the axial movement of the arms and spring 64 continues, the edge of the ply stock folds over the outer surface of the bead core 84 and finally the spring 64 engages the ply stock as seen in phantom lines in FIG. 4. This final portion of the movement of the arms 63 and the spring 64 effects to smooth and stitch down the edge 88 of the ply stock. It is noted that with the ability to move the cam means 67 along with the ply turn-up means 38, the cam means can effect a greater radial turn-up than normally possible since there is greater flexibility of movement and the tapered surface of the cam means can have a greater radial dimension in taper. With the completion of the folding and stitching operation, the rod end of cylinder 44 is pressurized to move the piston rod 55, crosshead 56, guide-rods 57, 58 along with ply turn-up and stitching mechanism 38. As the outboard ends of arms 63 of stitching mechanism 38 move back across the tire building drum the spring 64 perform an additional stitching operation. As the coil spring 64 moves off the edge of the core bead 84, the springs 64 and 70 encompass the cam means 67 and moves such cam means outwardly (or leftward as viewed in FIG. 4) until annular shoulder 74 on cam means 67 comes into abutting contact with shoulder 78 of housing 20. Pressurization of the head end of cylinder 41 moves the support frame 42 leftward as viewed in FIG. 1 along with bracket 45 and spindle 50 thereby retracting the tapered spindle end 51 out of the tire building drum 10 allowing the drum to come to rest on the conveying means 11 for subsequent conveyance to other tire building stations while another drum 10 will be located at the turn-up station for a repetition of the above described cycle of operations.

Although the invention has been described as applied to a multiple station tire building machine, it is apparent that the invention can be applied to a single station tire building machine or some variations therebetween as various modifications are contemplated and may obviously be resorted to by those skilled in the art without departing from the described invention, as hereinafter defined by the appended claims.

I claim:

1. In a tire building machine, a tire building drum having axially disposed support ends, a pair of support members on either side of said machine, a spindle mounted in each of said support members, one of said spindles moveable axially in one of said support members, the other one of said spindles being secured to the other one of said support members, ply turn-up means mounted on each of said support members for axial movement to and from said tire building drum, a first bracket means connected to said one spindle for movement therewith, a second bracket connected to said other one of said spindles, power operated means mounted on each of said brackets and operatively connected to said ply turn-up means for moving said ply turn-up means, cam means journaled on each of said spindles for movement axially on said spindles to and from said tire drum, power drive means interconnecting said one support member to said first bracket means for selective actuation for moving said first bracket means and said one spindle to chuck up said tire drum in cooperation with said other stationary spindle, a plurality of circumferentially spaced arms pivotally mounted on said ply turn-up means, said arms extending axially outwardly around each of said cam means to define a set of arms, each set of arms having an annular expansible and rollable member on the outboard end thereof, a cam follower on each of said arms and contacting said cam means, a spring member encompassing each set of arms for biasing said arms radially inwardly and being operative to move said cam means axially to and from said drum with said tire ply stock turn-up means, each of said cam means being moveable axially relative to said turn-up means, each of said spindles having stop means for limiting the axial movement of said cam means during axial movement of said turn-up means, and said power operated means operative upon actuation for moving said turn-up means axially toward said tire drum and operative to effect a predetermined radial movement to said expansible and rollable member and a stitching of the edge of ply stock on said drum upon contact of said cam means with said stop means.

2. In a tire building machine as set forth in claim 1 wherein said cam means has a radially outwardly tapering surface that effects a radial outward sweeping motion to each of said arms and to said annular expansible and rollable member.

3. In a tire building machine of the multiple station type wherein tire building drums are conveyed from station to station for successive tire building operations, each of said tire building drums having a cylindrical surface with spaced annular side edges and a central shaft, with such cylindrical surface receiving ply stock that extends beyond said side edges and beyond a bead core that is positioned at said side edges on said drum, said machine having a pair of spaced support members mounted at one station, a ply turn-up device mounted on each one of said support members for axial movement to and from said tire building drum, a drum support spindle mounted on each one of said support members, each spindle having an inner end portion for chucking said central shaft, an axially moveable cam means mounted on each of said spindles for movement to and away from said tire drum with said spindle as well as moveable axially relative to said spindles, a stop means on each of said spindles limiting the axial movement of said cam means toward said drum, each of said ply turn-up devices having a plurality of circumferentially spaced arms extending axially toward said drum forming a set of arms, each of said arms having a cam follower operatively contacting said cam means, each set of arms having an annular expansible and rollable member, spring means circumferentially encompassing each of said set of arms for biasing said arms radially inwardly to have said cam followers in contact with said cam means and operative to move said cam means axially with said ply turn-up device as limited by said stop means, and power operated means connected to each of said ply turn-up devices for moving said turn-up devices along with said cam means toward said tire drum as limited by said stop means to effect upon contact of said stop means by said cam means a predetermined radial movement to said expansible and rollable member effecting a folding of the ply stock over bead cores that extends beyond said side edges over bead cores followed by a smoothing out of said ply stock on said side edges of said drum.

4. In a tire building machine as set forth in claim 3 wherein power operated drive means is connected to one of said spaced support members, said power operated drive means is operative upon actuation to move said one support member and the drum support spindle carried thereby toward said tire building drum for chucking said tire building drum in cooperation with the remaining one of said drum support spindles.

5. In a tire building machine as set forth in claim 4 wherein each of said cam means has an annular outwardly extending surface progressively larger in diameter toward said drum to provide said radial lifting of said arms relative to said cam upon abutting contact by said cam with said stop means.

6. In a tire building machine having a tire drum with axially disposed end portions, a pair of support members on either side of said machine, a spindle mounted in each of said support members for supporting said tire building drum, ply turn-up means mounted on each of said support members for axial movement to and from said tire building drum, power operated means mounted on said machine and operatively connected to said ply turn-up means for moving said ply turn-up means, cam means journaled on each of said spindles for movement thereon to and from said tire drum, each of said ply turn-up means having a plurality of circumferentially spaced arms, said arms extending axially outwardly around each of said cam means to define a set of arms, each set of arms having an annular expansible and rollable member on one end of said arms, a cam follower on each of said arms and contacting said cam means, a spring member encompassing each set of arms for biasing said arms radially inwardly, said spring member being operative to move said cam means axially to and from said drum with said tire ply stock turn-up means, each of said cam means being moveable axially relative to said turn-up means, each of said spindles having stop means for limiting the axial movement of said cam means during continued axial movement of said turn-up means, said power operated means operative upon actuation for moving said turn-up means axially toward said tire drum to effect a predetermined radial movement to said expansible and rollable member and a stitching of the edge of ply stock on said drum upon contact of said cam means with said stop means and said cam means being cone shaped to provide a radially outwardly tapering surface that effects a radial outward sweeping turn-up motion to each of said arms and to said annular expansible and rollable member followed by an axial motion to effect completion of said turn-up and stitching.

* * * * *